United States Patent
Chintakunta

(10) Patent No.: US 11,812,186 B2
(45) Date of Patent: *Nov. 7, 2023

(54) INTERACTIVE REPLACEMENT OF CHARACTER FACES

(71) Applicant: DISH NETWORK TECHNOLOGIES INDIA PRIVATE LIMITED, Bengaluru (IN)

(72) Inventor: Jayaraghavendra Chintakunta, Bangalore (IN)

(73) Assignee: DISH Network Technologies India Private Limited

( * ) Notice: Subject to any disclaimer, the term of this patent is extended or adjusted under 35 U.S.C. 154(b) by 0 days.

This patent is subject to a terminal disclaimer.

(21) Appl. No.: 17/869,473

(22) Filed: Jul. 20, 2022

(65) Prior Publication Data

US 2022/0353439 A1 Nov. 3, 2022

Related U.S. Application Data

(63) Continuation of application No. 16/748,944, filed on Jan. 22, 2020, now Pat. No. 11,425,317.

(51) Int. Cl.
*H04N 5/272* (2006.01)
*G06F 3/00* (2006.01)
*G06F 3/04842* (2022.01)
*G06V 40/16* (2022.01)

(52) U.S. Cl.
CPC ............. *H04N 5/272* (2013.01); *G06F 3/005* (2013.01); *G06F 3/04842* (2013.01); *G06V 40/166* (2022.01); *G06V 2201/10* (2022.01); *H04N 2005/2726* (2013.01)

(58) Field of Classification Search
CPC .. H04N 7/18; H04N 5/272; H04N 2005/2726; H04N 5/00; H04N 5/14; H04N 9/64; G06F 3/005; G06F 3/04842; G06V 40/166; G06V 2201/10
USPC ................ 348/576, 578, 157; 345/629, 619; 382/282, 295
See application file for complete search history.

(56) References Cited

U.S. PATENT DOCUMENTS

| | | | |
|---|---|---|---|
| 8,786,782 B2 * | 7/2014 | Deshpande | H04N 5/2723 348/584 |
| 11,068,697 B2 * | 7/2021 | Liu | G06V 10/82 |
| 11,089,238 B2 * | 8/2021 | Shaburov | H04N 5/265 |
| 2003/0007700 A1 * | 1/2003 | Gutta | G06T 17/00 382/282 |
| 2014/0375545 A1 * | 12/2014 | Ackerman | G06F 3/0304 345/156 |

\* cited by examiner

*Primary Examiner* — Trang U Tran
(74) *Attorney, Agent, or Firm* — KW Law, LLP

(57) ABSTRACT

Systems and processes are provided for interactive reassignment of character faces in an audio video program. An audio video input receives an audio video program. A user interface receives a request to substitute an original character face within the audio video program with an alternative character face. The system uses a buffer to delay the audio video program and generate a delayed audio video program. A processor detects the original character face in the audio video program and replaces the original character face in the delayed audio video program with the alternative character face to generate a modified and delayed audio video program. The modified delayed audio video program is sent to a display and loudspeaker.

20 Claims, 5 Drawing Sheets

INTERACTIVE REPLACEMENT OF CHARACTER FACES

CROSS REFERENCE TO RELATED APPLICATIONS

This application claims priority to U.S. patent application Ser. No. 16/748,944 entitled "METHOD AND APPARATUS FOR INTERACTIVE REPLACEMENT OF CHARACTER FACES IN A VIDEO DEVICE" and filed on Jan. 22, 2020, which is incorporated herein by reference.

TECHNICAL FIELD

The following discussion generally relates to real time editing of audio video programming on an electronic device. More particularly, the following discussion relates to receiving a user input from a user indicative of an alternate character face in an audio video program. The system and method are then operative to replace the original character face with the alternate character face during playback of the audio video program to the user.

BACKGROUND

The real time presentation of audio video programs, such as via broadcast television, has been an entertainment staple for the better part of a century. Early television broadcast stations transmitted programing during only a portion of the 24 day, often ceasing transmission during the overnight hours, and the received programming was immediately displayed to the viewer without opportunity to delay, save or customize the home viewing experience. Currently, audio video programming may be received via over the air broadcast, cable networks, satellite retransmission, streaming via the internet or other network connection, or may be delivered via a media storage device, such as a digital video disk, or video tape.

In some instances, broadcast audio video content may be edited by a broadcast before transmission. For example, expletives may be muted or edited before transmission, so they are not presented to viewers during playback on the user device, such as a television or set top box. However, during playback of a received audio video program, user may wish to edit content within the audio video program to suit their individual tastes or requirements before the content is presented. To satisfy these requirements, it would be desirable to facilitate a viewer desire to substitute original content with preferred content at the display device. Other desirable features and characteristics will become apparent from the subsequent detailed description and the appended claims, taken in conjunction with the accompanying drawings and this background section.

BRIEF SUMMARY

Disclosed herein are human machine interface methods and systems and related circuitry for provisioning computational systems, methods for making and methods for operating such systems, and system equipped with onboard control systems. By way of example, and not limitation, presented are various embodiments of character image substitution during playback of an audio video program in a video device are disclosed herein.

In accordance with an aspect of the disclosure, a method including receiving an audio video program, receiving a request to substitute an original character face within the audio video program with an alternative character face, delaying the audio video program to generate a delayed audio video program, detecting an occurrence of the original character face within the audio video program, replacing the occurrence of the original character face in the delayed audio video program with an image of the alternative character face to generate a modified delayed audio video program, and coupling the modified delayed audio video program to a display and loudspeaker.

In accordance with another aspect of the disclosure wherein the alternative character face is computer generated in response to a user input indicative of a characteristic of the alternative character name.

In accordance with another aspect of the disclosure wherein the request to substitute an original character face within the audio video program with the alternative character face is generated in response to a user request generated via a user interface.

In accordance with another aspect of the disclosure wherein the occurrence of the original character face is detected in response to a facial recognition algorithm.

In accordance with another aspect of the disclosure wherein the request to substitute an original character face within the audio video program with the alternative character face is generated in response to a user selection of the original character face and the alternative character face via a graphical user interface presented on a display.

In accordance with another aspect of the disclosure where detecting the occurrence of the original character face further includes determining a program time location corresponding to the occurrence of the original character face in the audio video program and where the program time location is used to replace the original character face in the delayed audio video program with the alternate character face.

In accordance with another aspect of the disclosure wherein the request to substitute the original character face within the audio video program with the alternative character face is received in response to a user selection in a graphical user interface displayed on the display.

In accordance with another aspect of the disclosure wherein the image of the alternate character face is captured by a camera in response to the request to substitute the original character face within the audio video program with the alternative character face.

In accordance with another aspect of the disclosure, an apparatus including an input configured for receiving an audio video program, a display device configured to display a video portion of the audio video program, a buffer for generating a delayed audio video program in response the audio video program, a processor operative to receive a request to substitute an original character image in the audio video program with an alternative character image, the processor being further operative to detect an occurrence of the original character image within the audio video program and to replace the original character image in the delayed audio video program with the alternative character image to generate a modified delayed audio video program in response to detecting the original character image within the audio video program and to couple the modified delayed audio video program to the display device.

In accordance with another aspect of the disclosure a network interface for receiving a metadata associated with the audio video program.

In accordance with another aspect of the disclosure wherein the buffer is a memory configured to store a portion of the audio video program.

In accordance with another aspect of the disclosure, a user input for receiving a user indication of the original character image and an alternative character image.

In accordance with another aspect of the disclosure wherein the processor is further operative to generate a graphical user interface for presenting a first character image and a second character image associated with the audio video program and an input for receiving an alternate character input in response to a user input.

In accordance with another aspect of the disclosure, a camera for capturing the alternative character image.

In accordance with another aspect of the disclosure wherein the processor is configured to detect the occurrence of the original character image in response to a facial recognition operation on the audio video program.

In accordance with another aspect of the disclosure wherein the audio video program further includes metadata related to a character associated with the audio video program and wherein the processor is configured to detect the occurrence of the original character image in response to the metadata associated with the audio video program.

In accordance with another aspect of the disclosure wherein the alternative character image is an image of a user captured by a camera in response to a user input.

In accordance with another aspect of the disclosure wherein the alternate character image is one of a plurality of images stored in a memory and wherein the alternate character image is selected from the plurality of images in response to a user input.

In accordance with another aspect of the disclosure, an apparatus for interactive reassignment of character faces in an audio video program including a tuner configured for receiving and demodulating a signal to extract the audio video program, a user input operative to receive a user request to substitute an original character face within the audio video program with an alternative character face, a memory configured to buffer the audio video program to generate a delayed audio video program, a processor configured to detect the original character face within the audio video program and to replace the original character face with the alternative character name within the delayed audio video program to generate a modified audio video program, and a display configured to display the modified audio video program.

In accordance with another aspect of the disclosure wherein the processor is further operative to detect the original character face in response to a facial recognition process performed on the audio video program.

The above advantage and other advantages and features of the present disclosure will be apparent from the following detailed description of the preferred embodiments when taken in connection with the accompanying drawings.

BRIEF DESCRIPTION OF THE DRAWING FIGURES

Example embodiments are described below in conjunction with the following drawing figures, wherein like numerals denote like elements, and wherein.

The examples set forth herein illustrate embodiments of the disclosure, and such exemplifications are not to be construed as limiting the scope of the disclosure in any manner.

DETAILED DESCRIPTION

The following detailed description is intended to provide various examples, but it is not intended to limit the disclosure or the application and uses of the disclosure. Furthermore, there is no intention to be bound by any theory presented in the preceding background or the following detailed description.

The general concepts described herein may be implemented in any audio video display device or connected device that may be used for audio video streaming or presentation to an audio video display device the like. For convenience of illustration, the following discussion often refers to a video signal processing device, such as a television, operative to receive audio video content and to display the audio video content on a display, such as a liquid crystal display (LCD) to a view. The actions taken in response to the presentation and alternation of audio video content for display to a viewer may also be associated with the functionality of the mobile phones, portable electronic entertainment devices, and any other electronic media device capable of image or video display and/or playback. Additional details and examples are provided in the following description.

Figure 1:
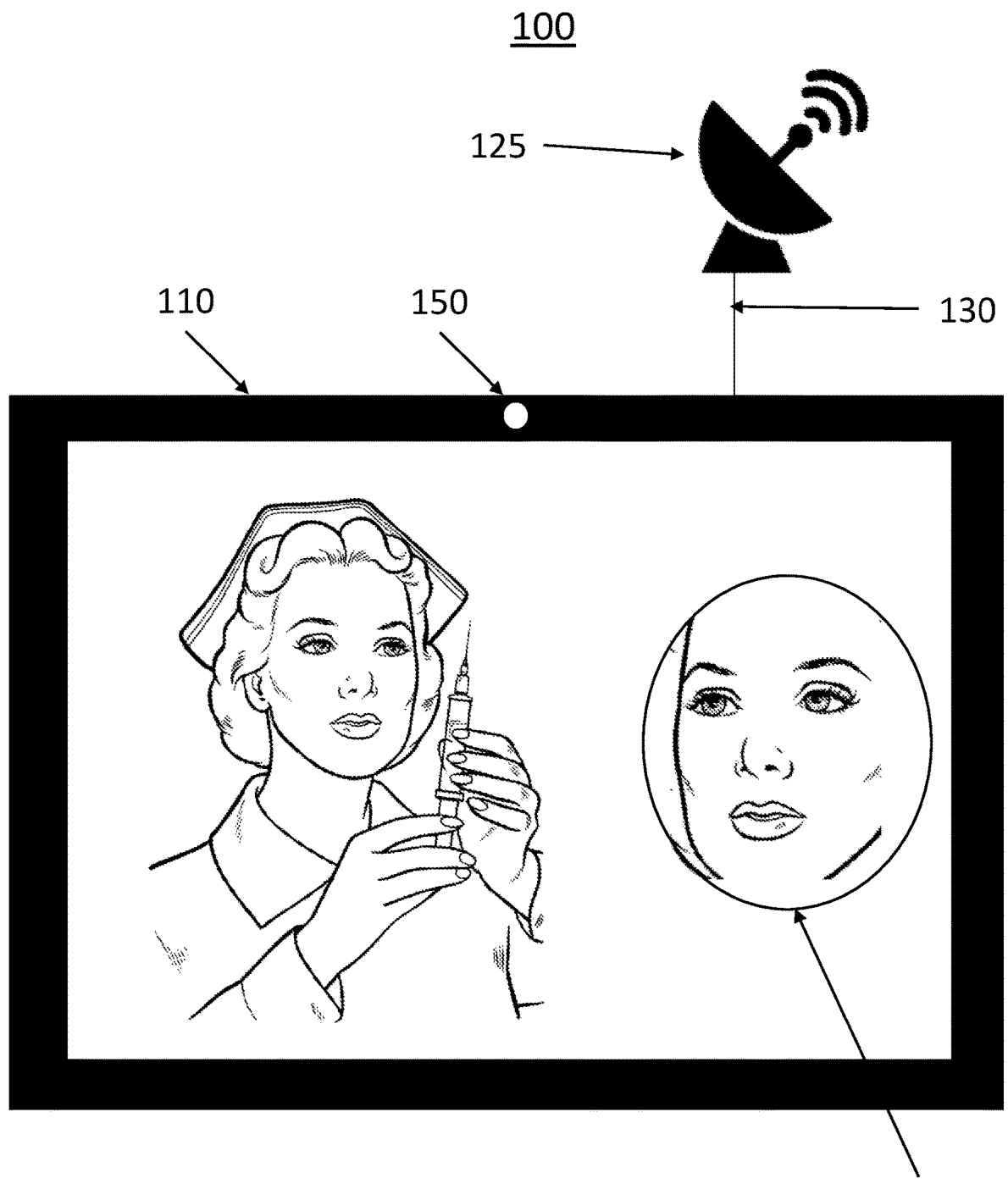
FIG. 1 shows an environment for interactive reassignment of character images in a video device according to an exemplary embodiment of the present disclosure.

Turning now to FIG. 1, an environment for a system 100 for interactive reassignment of character images in a video device according to an exemplary embodiment of the present disclosure is shown. The exemplary system 100 may include a television 110 for presenting an audio video program, a graphical user interface 112 for receiving an alternate character image. In addition, the television may include an integrated camera 150 for capturing an alternate character image. According to an exemplary embodiment, the television 110 may be operative for receiving, decoding and displaying an audio video program and displaying the audio video program to a viewer. In an exemplary embodiment, the alternate character image may be an alternate character face wherein the face of an original character in the audio video program is replaced by an image or representation of a face provided or selected by a user.

In this exemplary embodiment, the television 110 is operative to receive an audio video program via an antenna 125 or the like. In one example, the antenna 125 may be operative to receive microwave satellite transmission including the audio video program and may include a low noise block amplifier and or decoding/demodulation circuitry and/or componentry. The antenna 125 may couple the received audio video program via a cable 130, or the like, to the television 110. In one exemplary embodiment, the audio video program may be coupled from the antenna 125 to a set top box (not shown) for additional processing before a processed audio video program is coupled from the set top box to the television 110. In one exemplary embodiment, the audio video program may further include metadata or the like including information related to the audio video program, such as description, title, run time, character names, geographical locations, etc. In addition, the metadata may include one or more character images associated with each of the character names.

Further in this exemplary embodiment, the television 110 may include circuitry, processors, or the like, to enable a graphical user interface 112 to be displayed on the television 110. The graphical user interface 112 may be enabled to allow a user to reassign an original character image, or original character face, within the audio video program with an alternate character image or alternate character face. For example, the television 110 may be operative to receive a control signal from a user input device, such as a remote control, indicating a user desire to activate the graphical user interface 112. The television 110 may then display the graphical user interface 112 in response to the control signal. The user may then be operative to provide input via a user input, such as a remote control, in order to select an original character face for replacement and an alternate character face to be used as the replacement.

In the exemplary system, it may be desirable for a viewer or user to replace a face of a character in an audio video program with an alternate face. For example, the user may wish to replace the face of an original character with a user's own face captured via the user interface 112 and the camera 150. The exemplary system may be operative to receive an indication from a user to perform the face replacement process via a user input or the like. The system may then be operative to receive an alternate face image via the camera 150 or from a memory in response to a menu selection wherein the user may select an image from one or more images stored in the memory. The exemplary system may then delay the audio video program to generate a delayed audio video program, perform a facial recognition process on the undelayed audio video program to locate an occurrence of the original character face, replace the original character face with the alternate character face in the delayed audio video program to generate a modified delayed audio video program, and then display the modified delayed audio video program to the user having the original character face replaced by the alternate character face.

In one exemplary embodiment, the graphical user interface 112 may be operative to be initiated in response to a user input, such as a button push on a remote control or a menu selection. The graphical user interface may then be operative to receive a video signal from the camera 150 or the like. A facial recognition algorithm may be performed on the video signal from the camera 150 to determine if a face has been detected within the video signal. For example, the video signal from the camera 150 may be overlaid on an audio video program currently being displayed on the television 110. The user may then position themselves in front of the camera 150 such that their face is displayed in the video signal displayed on the graphical user interface 112. The facial recognition algorithm may then be operative to detect the face within the video signal and to capture one or more images of the face. The exemplary system may then be operative to replace an original character face within the audio video program with the one or more captured images. The system may further be operative to generate a composite three dimensional face image from the one or more captured images in order to provide an alternate face image that may be rotated to match the orientation of the original character face.

Figure 2:
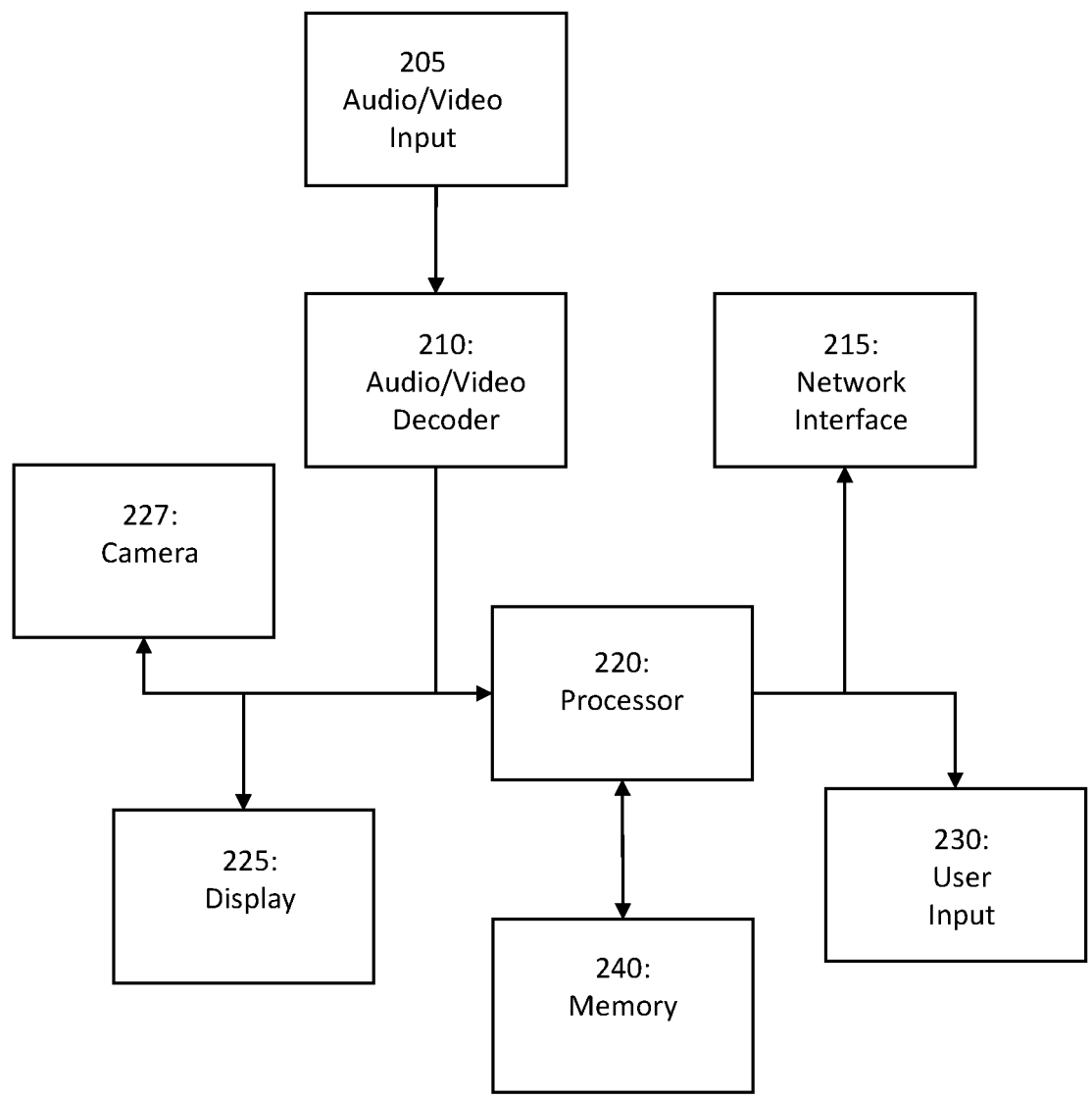
FIG. 2 shows a block diagram illustrating a system for interactive reassignment of character images for a video device according to an exemplary embodiment of the present disclosure.

Turning now to FIG. 2, a system 200 for interactive reassignment of character faces in a video device according to an exemplary embodiment of the present disclosure is shown. The system 200 may include an audio/video input 205, an audio/video decoder 210, a processor 220, a network interface 215, user input 230, display 225, camera 227, and a memory 240. The audio/video input 205 is operative to receive an audio-visual program. The audio/video input 205 may include a radio frequency or microwave tuner operative to receive a data representative of an audio video program modulated on a radio frequency or microwave carrier signal. Alternatively, the audio/video input 205 may be a network interface operative to receive data formatted for network transport, such as TCP/IP and to extract the audio video program from the transport packets. The audio/video input 205 may be a cable television tuner, or the like, operative to receive an ATSC, NTSC, or quadrature amplitude modulated (QAM) signal for transporting the audio video program. In an exemplary embodiment, the signal may be received via a cable television network, or satellite television network, or antenna based network.

The audio/video decoder 210 may be operative to receive the signal from the audio/video input 205 and to decode the signal to generate an audio video signal in a format suitable for the processor 220. For example, the audio/video decoder 210 may be operative to demodulate the signal from the audio/video input to extract the audio video program and to couple the audio video program to the processor 220. In an exemplary embodiment, the audio/video decoder 210 may be further operative to couple the audio video signal to an audio/video output for presentation on the video display 225 and speaker 227 or the like.

The processor 220 may be operative to receive the audio video signal from the audio/video input 205 and/or the audio/video decoder 210. The processor 220 may then be operative to optionally further process the audio video program and to couple the audio video program the speaker 227 and/or the display 225. The processor may be further operative to receive a request from the user input 230 requesting a character face change be performed. In response to the request for a character face change, the processor may be operative to initiate a character face change algorithm including generating a delayed audio video program, initiating the camera 227 to capture the alternative character face, and performing a facial recognition process on the audio video program in order to detect an original character face within the audio video program. Alternatively, the request for the character face change may include an original character face and an alternate character face where the user directs that the original character face be replaced with the alternate character face in the video portion of the audio video program.

In response to receiving the request for the character face change, the processor 220 may be operative to buffer the audio video signal within the memory 240 or other buffering means to generate a delayed audio video signal. The processor 220 may then be operative to monitor the original, undelayed audio video program for occurrences of the original character face. The processor 220 may detect the original character face using image recognition or facial recognition algorithms on frames of the video portion of the undelayed audio video program. In response to a detection of the original character face in the undelayed audio video program, the processor 220 may then replace the original character face with an alternate character face as provided in response to a user input to generate a modified delayed audio stream. The processor 220 may then be further operative to couple the modified delayed audio stream to the speaker 227 and the display 225 for presentation to the user.

The network interface 230 is operative to transmit and receive data from client devices on a network. For example, the network interface 230 may be part of a DVR and is operative to receive requests from one or more client devices on a network. The network interface 230 is then operative to transmit a list of available programs, a requested program, a thumbnail data file, or other information to a client device in response to a request from the client device. The network interface 230 may communicate directly with the client device or may communicate via a network router on a wireless local area network, such as a Wi-Fi network.

Figure 3:
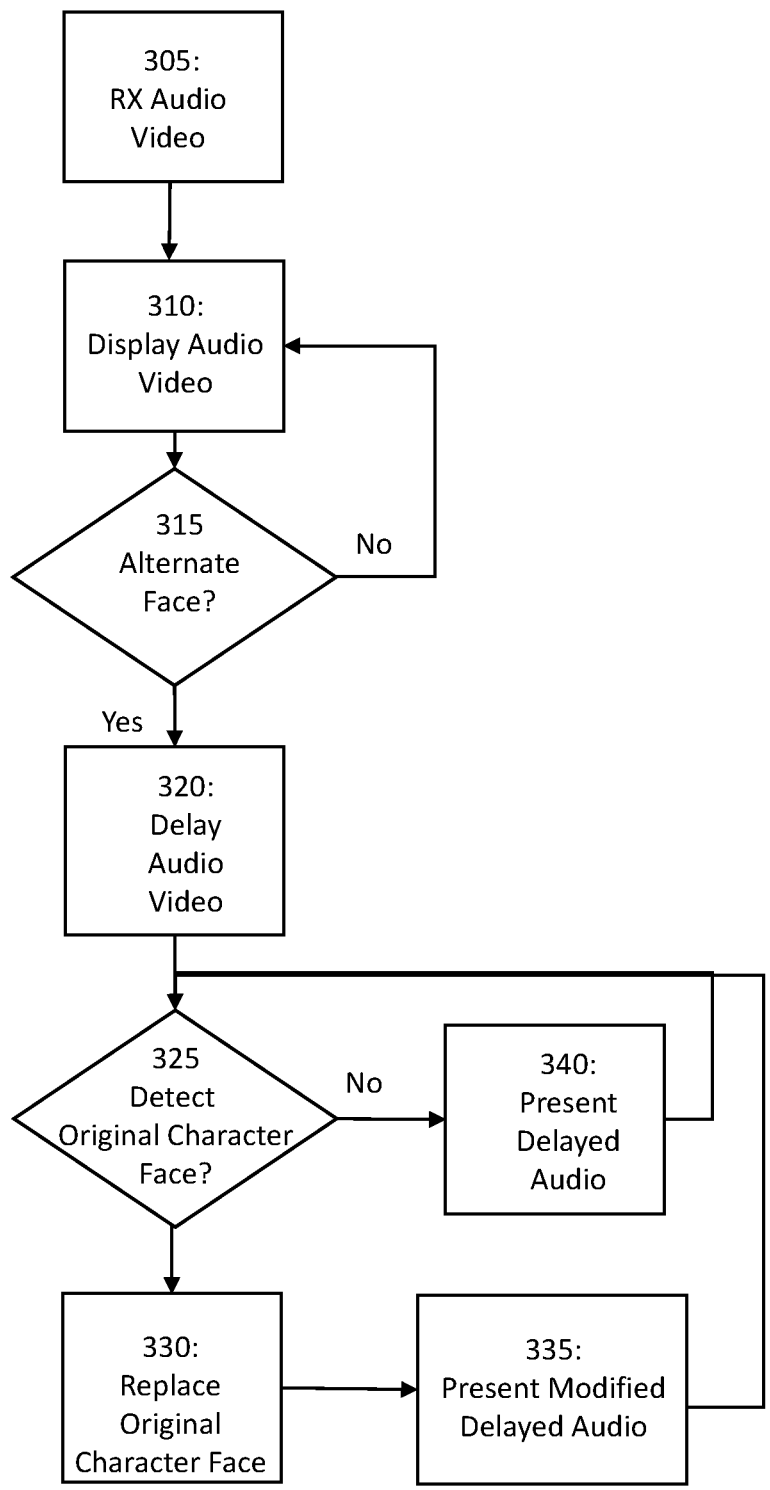
FIG. 3 shows a flowchart illustrating a method for interactive reassignment of character images for a video device according to an exemplary embodiment of the present disclosure.

Turning now to FIG. 3, a method 300 for interactive reassignment of character faces in a video device according to an exemplary embodiment of the present disclosure is shown. The method is first operative to receive 305 an audio video program via an antenna, video input, network interface or the like. The audio video program may be converted from a first transport format, such as ATSC to a second format suitable for display, such as baseband audio video or the like.

The method is next operative to display 310 the audio video program on a video display and audio loudspeakers. At this point, the audio video program is normally displayed and is not buffered by a character face substitution algorithm or the like. The display may be a video display, such as an LCD display wherein the processor performing the method is integral to an electronic device including the video display, such as a television, smartphone, or the like. Alternatively, the display may be a video output for coupling a baseband or similar signal to a display device such as a computer monitor. In this exemplary embodiment, the method may be performed by a processor integral to a set top box or computer and wherein the video signal is coupled from the set top box to the computer monitor or the like via a cable or wireless connection.

The method is next operative to determine 315 if a request for character face substitution has been received. The request may include the alternate character face selected by a user, the original face to be replaced in the audio video program and may further include the time during the program after which the character face will be substituted and may further include a stop time after which the character face substitution will cease. If no request is received, the method is operative to continue to display 310 the audio video program. If a request has been received, the method is next operative to delay 320 the audio video program for a predetermined time duration. The time duration may be determined in response to device design characteristics, such as processor speed, available memory and the like and should be long enough to perform the character face substitution function on the audio video program. In one exemplary embodiment, a memory buffer or the like may be used as first in-first out (FIFO) buffer to delay the video.

In an exemplary embodiment, the original character face to be replaced may be selected in response to a character face currently displayed in the undelayed audio video program at the time of a received user input or may be selected in response to a menu selection where images of characters within the audio video program are presented to a user. The user may then generate a user input representing a selection of a character using a device such as a remote control or the like.

The method is next operative to perform a facial recognition process on the undelayed, or original, audio video stream in order to detect 325 occurrences of the original face in the undelayed audio video stream. In one exemplary embodiment, detections 325 of the original character face may be performed by monitoring the undelayed audio video stream, detecting a face within an image from the undelayed audio video stream, isolating the face, detecting facial features within the isolated face, determining locations of facial features and then determining if the isolated face is the selected original character face in response to the location of the facial features. Alternatively, the facial recognition algorithm may use three-dimensional facial recognition techniques determined over multiple image frames of the undelayed audio video stream or may use skin texture analysis to recognize patterns, lines and spots on the detected face. In addition, the method may use a combination of facial recognition techniques to detect the original character face.

If an occurrence of the original character face is detected 325 in the undelayed audio video stream, the method is next operative to replace 330 the original character face in the delayed audio video stream with the alternate character face. In an exemplary embodiment, the location within the video frame as well as other physical characteristics, such as size, orientation, etc., of the original character face may be determined from the undelayed audio video stream. The method is then operative to replace the original character face in the delayed audio video stream with the selected or provided alternate character face. The alternate character face may include one or more images of the alternate character face such that an alternate character face may be generated having an appropriate orientation, size, and other physical characteristics for replacing the original character face in the delayed audio video stream. In an alternative exemplary embodiment, the original character face in the delayed audio stream may be replaced with a computer-generated version of the alternate character face.

In another exemplary embodiment, when the original character face is detected within the undelayed audio video stream, a time indicator from the audio video program is retrieved to determine the start and end time of the appearance of the original character face within the audio video stream. This start and end time may then be used to replace the original character face in the delayed audio video stream with the alternate character face. In addition, this start and start time may be used to determine a duration of the original character in order to guide a computer generation of an alternative character face. Once the original character face is replaced by the alternate character face in the delayed audio video stream to generate a modified delayed audio video stream, the modified delayed audio video stream is then presented 335 to the viewer and/or user. The method is then operative to return to detecting the original character face in the undelayed audio video stream.

Figure 4:
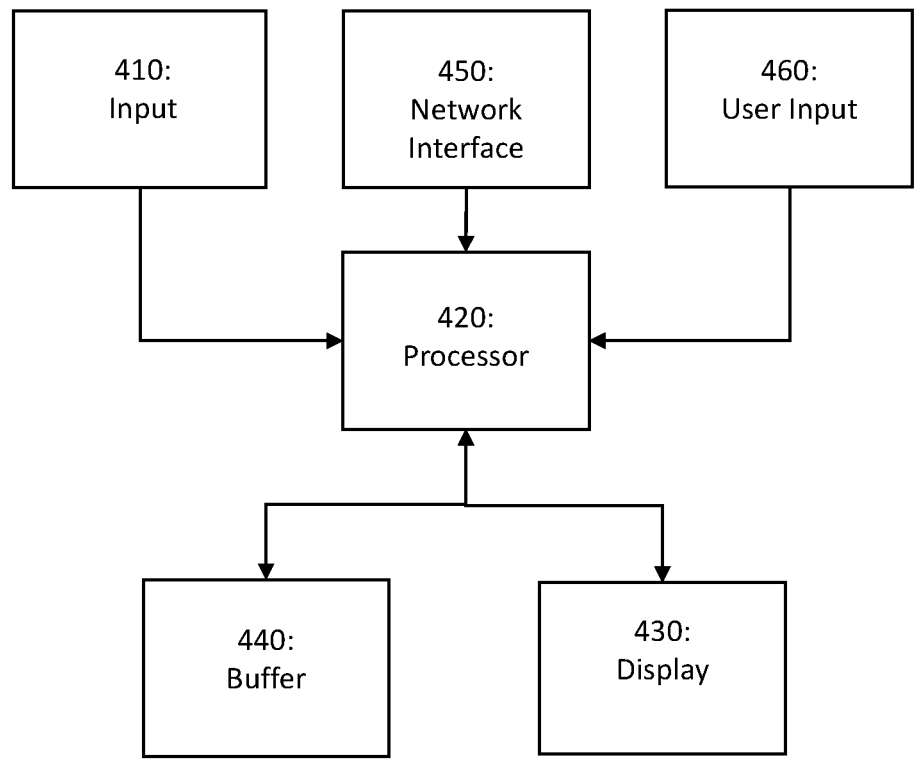
FIG. 4 shows a block diagram illustrating a system for interactive reassignment of character images according to another exemplary embodiment of the present disclosure.

Turning now to FIG. 4, a system 400 for interactive reassignment of character faces in a video reproducing device according to an exemplary embodiment of the present disclosure is shown. The system 400 may include an input 410, a processor 420, a display 430, a buffer 440, a network interface 450, and a user input 460.

The exemplary system 400 may include an input 410 configured to receive an audio video program. The audio video program may include a video portion and an audio portion. In one exemplary embodiment, the input 410 may be a tuner configured for receiving a radio frequency or microwave signal and demodulating the signal to extract the audio video program. In one exemplary embodiment, the audio video program may include metadata related to a character associated with the audio video program. In an additional exemplary embodiment, the audio video program may include metadata related to a character associated with the audio video program, such as closed captioning information, and wherein the processor 420 may be configured to detect the occurrence of the original character image in response to the metadata associated with the audio video program.

The exemplary system 400 may further include a display 430 configured to display a video portion of the audio video program. In one exemplary embodiment, the display 430 is a television having an integral LCD display and multiple speakers for recreating the audio video program for a viewer.

The exemplary system 400 may further include a buffer 440 for generating a delayed audio video program in response the audio video program. In one exemplary embodiment, the buffer 440 is a memory configured to store a portion of the audio video program. In another exemplary embodiment, the buffer 440 is a first in first out (FIFO) buffer used to temporarily store portions of the audio video program, thereby providing a delay between a frame of the audio video program being stored in the buffer 440 and the frame being output from the buffer 440.

The exemplary system 400 may further include a processor 420 operative to receive a request to substitute an original character image in the audio video program with an alternative character image. The processor 420 may be further operative to detect an occurrence of the original character image within the audio video program and to replace the original character image in the delayed audio video program with an alternative character image to generate a modified delayed audio video program. In an exemplary embodiment, the processor 420 may be configured to detect the occurrence of the original character image in response to a facial recognition operation on the audio video program. In one exemplary embodiment, the alternative character image may be received from a camera. In an additional embodiment, the camera is integral to a television device and the alternative character image is an image of a television viewer proximate to the television device. Alternatively, the alternative character image may be one of a plurality of images stored on a memory and the alternative character image may be selected by a user via the user input and/or a graphical user interface presented on the display 430. The processor 420 may be further operative to couple the modified delayed audio video program to the display 430. The processor 420 may be further operative to generate a graphical user interface for presentation on the display 430 for presenting a first character image and a second character image associated with the audio video program and an input for receiving an alternate character input in response to a user input.

The exemplary system 400 may further include a network interface 450 for receiving a metadata associated with the audio video program. In addition, the network interface 450 may be operative to receive the alternative character image. In one embodiment, a user may generate a request for a plurality of character images from a server accessed via the network interface. The user may then select one of a received plurality of character images to be used as the alternative character image. In an exemplary embodiment, the alternate character image is one of the plurality of character images stored in a memory and wherein the alternate character image is selected in response to a user input. The exemplary system 400 may further include a user input 460 for receiving a user indication of the original character image and an alternative character image.

Figure 5:
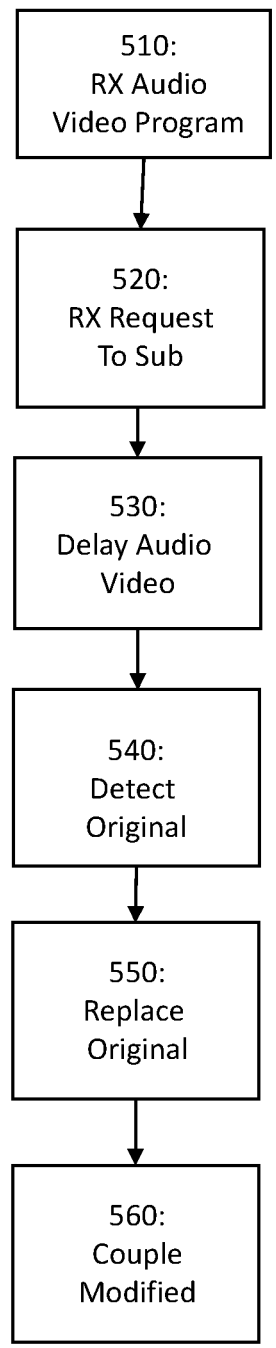
FIG. 5 shows a flowchart illustrating a method for interactive reassignment of character images according to another exemplary embodiment of the present disclosure.

Turning now to FIG. 5, a method 500 for interactive reassignment of character faces in an audio reproducing device according to an exemplary embodiment of the present disclosure is shown. The method is first operative for receiving 510 an audio video program.

The method is next operative for receiving 520 a request to substitute an original character face within the audio video program with an alternative character face. In an exemplary embodiment, the request to substitute an original character face within the audio video program with the alternative character face is generated in response to a user request generated via a user interface. For example, the request to substitute an original character face within the audio video program with the alternative character face may be generated in response to a user selection of the original character face and the alternative character face via a graphical user interface presented on a display. In one exemplary embodiment, the image of the alternate character face may be captured by a camera in response to the request to substitute the original character face within the audio video program with the alternative character face. In an alternative exemplary embodiment, the alternative character face may be computer generated in response to a user input indicative of a characteristic of the alternative character name.

The method is next operative for delaying 530 the audio video program to generate a delayed audio video program. The audio video program may be delayed using a buffer memory, such as a FIFO buffer. In an alternative embodiment, the method is operative to request from a service provider and receive a second version of the audio video program wherein the second version is time delayed from a first version of the audio video program. The second version of the audio video program is then employed as the delayed audio video program.

The method is next operative for detecting 540 an occurrence of the original character face within the audio video program. In an exemplary embodiment, the occurrence of the original character face is detected in response to a facial recognition algorithm. Additionally, detecting the occurrence of the original character face may include determining a program time location corresponding to the occurrence of the original character face in the audio video program and where the program time location is used to replace the original character face in the delayed audio video program with the alternate character face The method is next operative for replacing 550 the occurrence of the original character face in the delayed audio video program with an image of the alternative character face to generate a modified delayed audio video program. Finally, the method is then operative for coupling 560 the modified delayed audio video program to a display.

The term "exemplary" is used herein to represent one example, instance or illustration that may have any number of alternates. Any implementation described herein as "exemplary" should not necessarily be construed as preferred or advantageous over other implementations. While several exemplary embodiments have been presented in the foregoing detailed description, it should be appreciated that a vast number of alternate but equivalent variations exist, and the examples presented herein are not intended to limit the scope, applicability, or configuration of the disclosure in any way. To the contrary, various changes may be made in the function and arrangement of the various features described herein without departing from the scope of the claims and their legal equivalents.

What is claimed is:

1. A method comprising:
identifying an alternative character face to replace an original character face in a video program, wherein the alternative character face is selected from a plurality of alternative character faces;
receiving a first version of the video program;
generating a delayed version of the video program having a time delay from the first version;
detecting an original character face in the first version of the video program;
determining a time indicator corresponding to an occurrence of the original character face in the first version of the video program; and
replacing, using the determined time indicator, the original character face in the delayed version of the video program with the alternative character face to generate a modified version of the video program having the time delay from the first version.

2. The method of claim 1, wherein the alternative character face is computer generated in response to a user input indicative of a characteristic of the alternative character face.

3. The method of claim 1, further comprising receiving a request to replace the original character face in response to a user request generated via a user interface.

4. The method of claim 1, wherein the original character face is detected using a facial recognition algorithm.

5. The method of claim 1, wherein a request to substitute the original character face with the alternative character face is generated in response to a selection of the original character face and the alternative character face via a graphical user interface.

6. The method of claim 1, wherein determining the time indicator corresponding to the occurrence of the original character face in the first version of the video program comprises determining a start time and an end time of the occurrence of the original character face in the first version of the video program, and wherein using the determined time indicator to replace the original character face in the delayed version of the video program with the alternate character face comprises using the determined start time and end time to replace the original character face in the delayed version of the video program with the alternate character face.

7. The method of claim 1, wherein a request to substitute the original character face within the video program with the alternative character face is received in response to a user selection in a graphical user interface.

8. The method of claim 1, wherein the alternate character face is captured by a camera in response to a request to substitute the original character face within the video program with the alternative character face.

9. A content selection system, comprising:
an input configured to receive an audio video program;
a buffer for generating a delayed audio video program in response the audio video program, the buffer stored in memory or non-transitory data storage;
a display device configured to display a video portion of the audio video program or the delayed audio video program;
a processor in communication with the non-transitory data storage, wherein the processor is configured to execute instructions stored in the non-transitory data storage that cause the content selection system to perform operations, wherein the operations comprise:
identifying an alternative character face to replace an original character face in a video program, wherein the alternative character face is selected from a plurality of alternative character faces;
receiving a first version of the video program;
generating a delayed version of the video program having a time delay from the first version;
detecting an original character face in the first version of the video program;
determining a time indicator corresponding to an occurrence of the original character face in the first version of the video program; and
replacing, using the determined time indicator, the original character face in the delayed version of the video program with the alternative character face to generate a modified version of the video program having the time delay from the first version.

10. The content selection system of claim 9, further comprising a network interface for receiving a metadata associated with the audio video program.

11. The content selection system of claim 9, wherein the buffer is configured to store a portion of the audio video program.

12. The content selection system of claim 9, further including an interface for receiving a first input selecting of the original character face and a second input selecting the alternative character face.

13. The content selection system of claim 9, wherein the operations further comprise:
generating a graphical user interface to present a first character image and a second character image associated with the audio video program; and
receiving an input via the graphical user interface selecting the first character image or the second character image for replacement.

14. The content selection system of claim 9, further comprising a camera configured to capture images of the alternative character face.

15. The content selection system of claim 9, wherein the operations further comprise detecting the original character face in response to performing a facial recognition operation on the audio video program.

16. The content selection system of claim 9, wherein the audio video program includes metadata related to a character associated with the audio video program, wherein the operations further comprise detecting an occurrence of the original character face in response to the metadata associated with the audio video program.

17. The content selection system of claim 9, wherein an image of the alternative character face is captured by a camera in response to a user input.

18. The content selection system of claim 9, wherein the alternate character face is selected from a plurality of stored images in response to a user input.

19. An apparatus for interactive reassignment of character faces in a video program comprising:
a tuner configured to receive and demodulate a signal to extract a first version of the video program;
an interface configured to receive a request to replace an original character face from the video program with an alternative character face;
a memory configured to buffer the video program to generate a delayed version of the video program;
a processor configured to detect the original character face in the first version of the video program, determine a time indicator corresponding to an occurrence of the original character face in the first version of the video program, and to replace, using the determined time indicator, the original character face with the alternative character face in the delayed version to generate a modified version of the video program having a time delay from the first version; and a display configured to display the modified version of the video program.

20. The apparatus for interactive reassignment of character faces in the video program of claim 19, wherein the processor is further configured to detect the original character face in response to a facial recognition process performed on the video program.

* * * * *